United States Patent [19]

Endick et al.

[11] Patent Number: 5,339,360
[45] Date of Patent: Aug. 16, 1994

[54] METHOD OF SYNCHRONIZING LEDS BETWEEN A DIGITAL TELEPHONE AND REMOTE OPTIONS

[75] Inventors: Norman Endick; Larry Stell, both of Austin, Tex.

[73] Assignee: ROLM Company, Santa Clara, Calif.

[21] Appl. No.: 969,639

[22] Filed: Oct. 30, 1992

Related U.S. Application Data

[63] Continuation-in-part of Ser. No. 916,286, Jul. 17, 1992.

[51] Int. Cl.⁵ .............................................. H04M 1/00
[52] U.S. Cl. ..................................... 379/386; 379/442
[58] Field of Search ............... 379/386, 387, 369, 370, 379/442, 443, 313, 314, 368

[56] References Cited

U.S. PATENT DOCUMENTS

| | | | |
|---|---|---|---|
| 4,544,808 | 10/1985 | Milne et al. | 379/386 |
| 4,817,127 | 3/1989 | Chamberlin et al. | 379/67 |
| 5,099,514 | 3/1992 | Acree | 379/442 |

*Primary Examiner*—James L. Dwyer
*Assistant Examiner*—C. Smith

[57] ABSTRACT

A system and method of synchronizing visual indicators in digital telephone including at least one attached auxiliary device. Visual indicators on the base telephone and the auxiliary device are first set to an initial state. Later, as various telephony features are activated, corresponding ones of the visual indicators on the base telephone and the auxiliary device are operated at predetermined cadences. When the cadence control mechanism (and thus the visual indicators) of the base telephone reaches a predetermined state, a state machine in the base telephone sends a synchronization message to the auxiliary device and then continues to operate the visual indicators on the base telephone at their predetermined respective cadences. Upon receipt of the synchronization message, the auxiliary device sets its cadence control mechanism to the predetermined state, thus synchronizing them with their like cadence counterparts in the base digital telephone. The auxiliary device then continues to operate its visual indicators at their predetermined respective cadences.

19 Claims, 9 Drawing Sheets

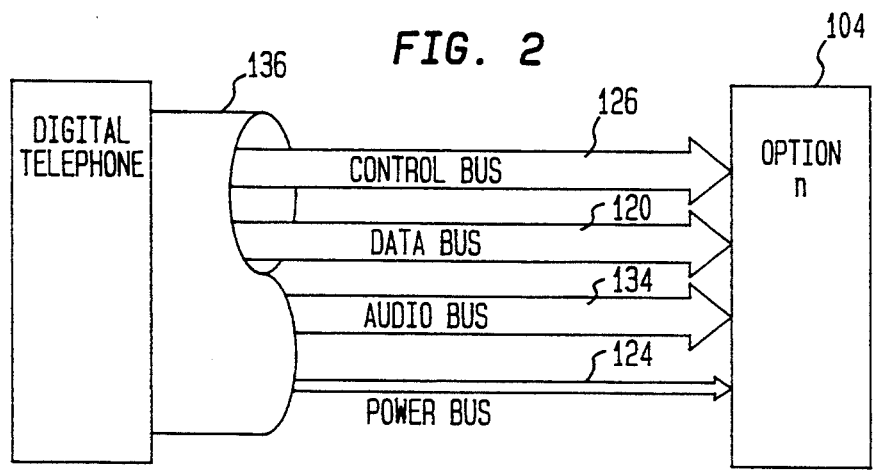
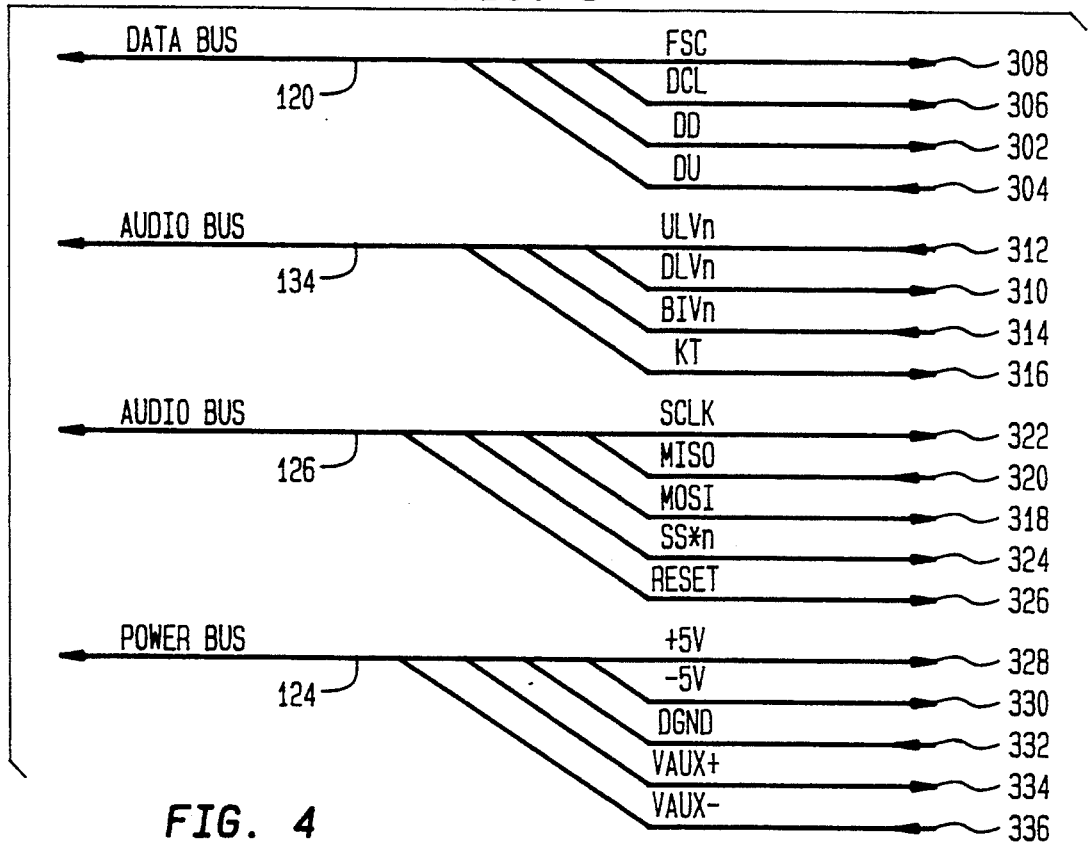
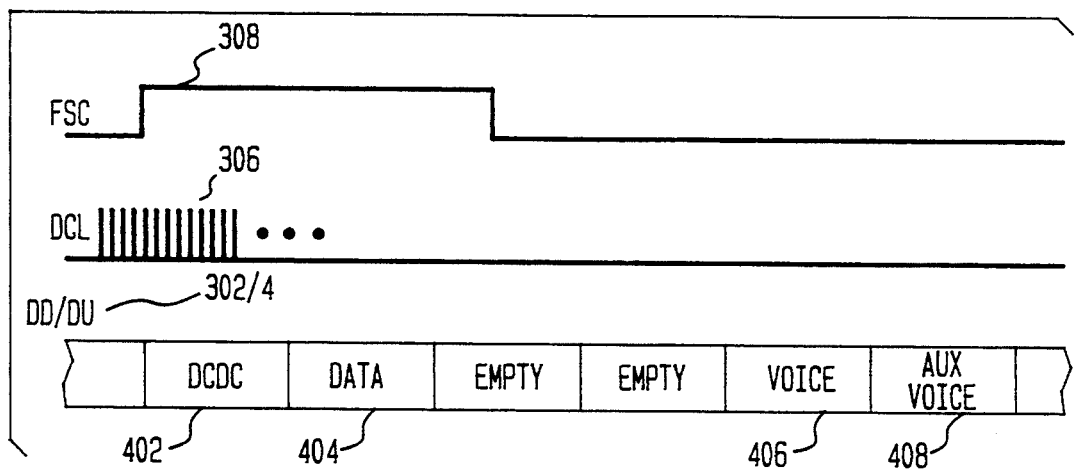

METHOD OF SYNCHRONIZING LEDS BETWEEN A DIGITAL TELEPHONE AND REMOTE OPTIONS

This is a continuation-in-part of application Ser. No. 07/916,286; filed Jul. 17, 1992.

I. BACKGROUND OF THE INVENTION

A. Field of the Invention

This invention relates to telephones having provision for the installation of auxiliary processing devices.

B. Related Art

Feature telephones commonly have a face which includes a number of keys and a number of visual indicators, such as light emitting diodes (LEDs). For example, as illustrated in FIG. 10, a base telephone 1002 can include a number of keys 1004 each having an adjacently located LED 1006. Commonly, the telephone 1002 will be connected to a private branch exchange (PBX) which will control the LEDs so as to indicate the activation of a function which may or may not have been initiated by the depression of an adjacent key.

Some telephones also have provision for the installation of optional devices such as extended keyboards 1012. Like the base telephone 112, the extended keyboard can include its own set of keys 1008 and LEDs 1010 whose functions are controlled by the PBX. Indicators across the base telephone unit and attached options (such as the extended keyboard 1012 of FIG. 10) typically operate to the user perception at various rates called cadences (usually a finite set). Cadences determine the nature of cycles of periods for indicators to be alternately on or off within a telephone. These cadences are used to indicate various states of the phone.

ROLMlink, a conventional digital telephony specification, defines 8 cadences (Cadence 0–Cadence 7). For example, a single cadence is used to indicate that an active phone call is associated with a line by having the indicator associated with the line key at a "solid" or always on cadence. As another example, a call waiting on another line would be indicated by the line key indicator at some specific periodic cadence.

The PBX (also referred to as the telephone switch) determines the cadence for individual indicators on each phone via commands or messages sent on the telephony link. A typical message from the PBX might cause an individual indicator to be set at a specific cadence, or all indicators to be set a specific cadence. The digital telephone and options keep track of the cadence each individual indicator is set to by the PBX and each has the responsibility to map these indicators to the periodic indication represented by the cadence corresponding to the indicator.

It is preferable for the user to have individual indicators operating at the same cadence across all units to be in synchronization (flash the same time as well as the associate rate). This gives the user a perception of a single system image, as opposed to a multiple system image. For example if one line on the base telephone 1002 and another line on the extended keyboard 1012 were both on "hold", the corresponding indicators would both be set (by the PBX) to the same periodic cadence. In order to make clearer to the user that both lines are, in fact, on "hold" (as opposed to in two different states) and to give the user a perception of a single system image, it would be preferable that they flash in synchronization.

II. SUMMARY OF THE INVENTION

According to a first aspect of the present invention, there is provided a system and method of synchronizing visual indicators in digital telephone including at least one attached auxiliary device. Visual indicators on the base telephone and the auxiliary device are first set to an initial state. Later, as various telephony features are activated, corresponding ones of the visual indicators on the base telephone and the auxiliary device are operated at predetermined cadences. When the cadence control mechanism (and thus the visual indicators) of the base telephone reaches a predetermined state, a state machine in the base telephone sends a synchronization message to the auxiliary device and then continues to operate the visual indicators on the base telephone at their predetermined respective cadences. Upon receipt of the synchronization message, the auxiliary device sets its cadence control mechanism to the predetermined state, thus synchronizing them with their like cadence counterparts in the base digital telephone. The auxiliary device then continues to operate its visual indicators at their predetermined respective cadences.

According to another aspect of the present invention there is provided an extended keyboard for use in base digital telephone. The extended keyboard includes a plurality of visual indicators; means for receiving a message generated by the base digital telephone; means for recognizing the message as being a command to synchronize the visual indicators; means for setting the visual indicators to a predetermined state in response to the message; and, means for returning identification and status information the base digital telephone in response the message.

III. BRIEF DESCRIPTION OF THE DRAWING

The present invention will be better understood by reference to the drawing, wherein:

FIG. 2 is a more detailed diagram of the Option Bus of FIG. 1;

FIG. 3 shows the component signal lines of the Data Bus, Audio Bus, Control Bus and Power Bus of FIG. 2;

FIG. 4 is an exemplary data from and control signals on the Data Bus of FIGS. 1-3;

Like numbered reference numerals appearing in more than one figure represent like elements.

IV. DETAILED DESCRIPTION OF THE PREFERRED EMBODIMENT

Figure 1:
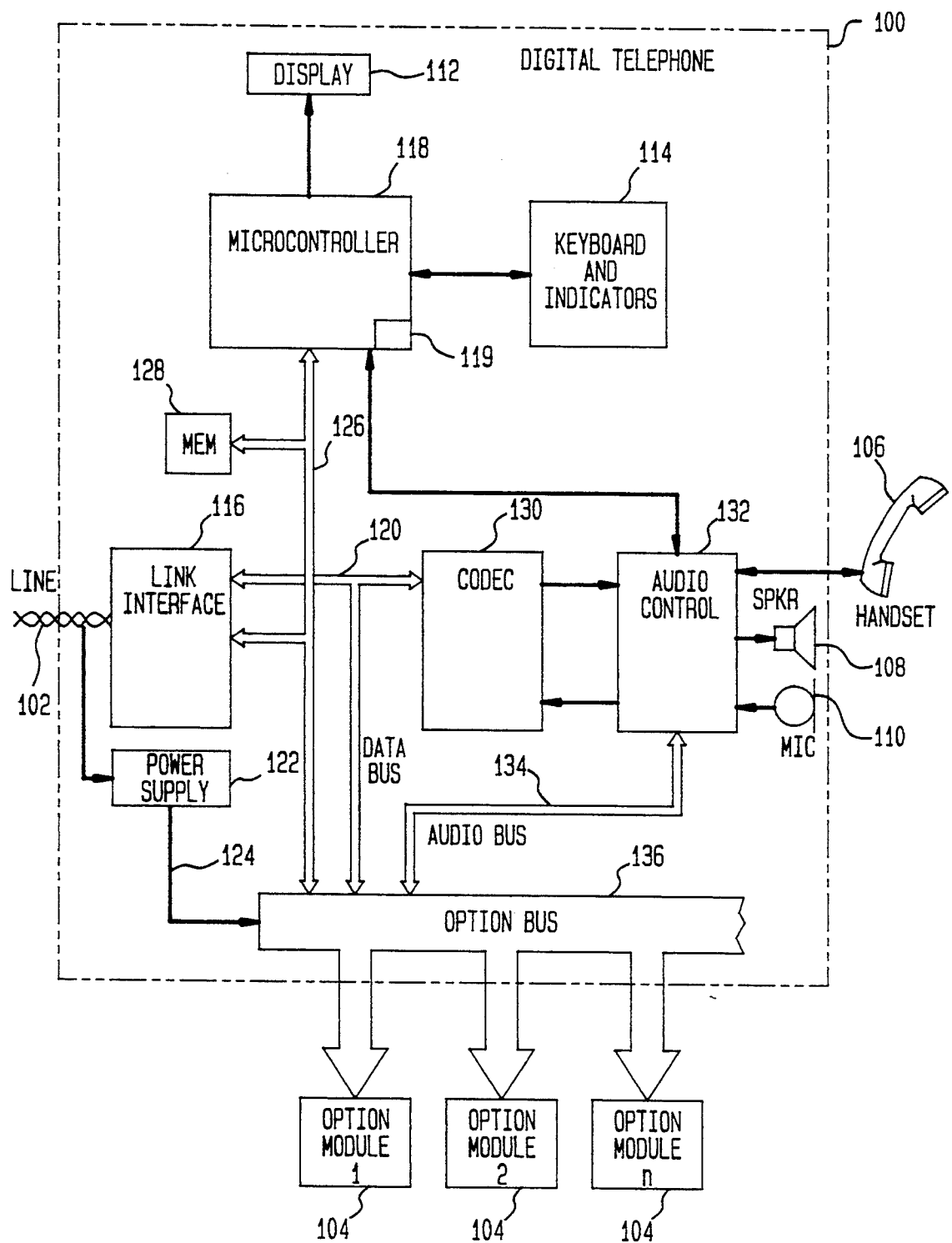
FIG. 1 is a diagram of a digital telephone according to an embodiment of the present invention.

An improved telephone, according to an embodiment of the present invention is illustrated schematically in FIG. 1. The base (main) telephone 100 includes a connection to a digital telephone line 102 (e.g. a ROLMlink line) and one or more connections for optional peripherals 104. The optional peripherals 104 will alternately be referred to in this disclosure as Option modules 104. Typically, the telephone also has a handset 106, speaker 108, microphone 110, display 112, and keyboard 114 with keys and indicators.

The telephone is connected to the digital telephone line 102 via the link interface 116 which handles transfers of telephone control information between a microcontroller 118 and the digital telephone line 102. The link interface 116 also translates the digital telephone line's voice and data format to the data format used on the Option Data Bus 120. The link interface 116 also provides miscellaneous timing signals required by the rest of the telephone. Also connected to the telephone line 102 is a power supply 122 which converts the telephone line's voltage to other voltages required by the telephone. These voltages are distributed within the telephone on a Power Bus 124.

The microcontroller 118 is connected to the link interface 116 via an Option Control Bus 126. The microcontroller 118 comprises a conventional microprocessor which controls all the telephone's functions, and is the source and destination of all communications with a private branch exchange (PBX) switch (not shown). The microcontroller 118 is also connected to a keyboard 114 and, optionally, to a display 112 and includes state control instructions 119 (which will be described in more detail later).

The keyboard 114 includes the telephone keys, the indicators and associated control logic. The display 112, typically an LCD device, is used to display messages sent from the PBX via the digital telephone line 102, or messages from an Option module 104 sent via the Option Control Bus protocol (described more in detail later in this document). Additionally, an external memory 128, which may be of non-volatile type, can be attached to the microcontroller 118 via the Option Control Bus 126.

A coder/decoder (CODEC) 130, is connected to the Option Data Bus 120 to convert the digital voice information to an analog form. The analog voice is amplified appropriately and routed to/from a handset 106 and/or a speaker 108 and microphone 110 by an audio control block 132. The audio routing is controlled by connections from the microcontroller 118. The audio control block 132 contains circuitry required for the hands-free speakerphone function. The audio control block 132 also routes analog audio signals to/from the Option Audio Bus 134 for use by the Option modules 104.

The Option Control Bus 126, the Option Data Bus 120, the Option Audio Bus 134 and the Power Bus 124 are collected together as the Option Bus 136. FIG. 2 further details the component busses of the Option Bus 136. The Option Bus 136 is linked to connectors in the telephone for connection to the Option modules 104. The Option modules 104 can be of the "plug-in" type which are user installable.

Purposes and functions of the Option modules 104 include but are not limited to additional keys and indicators, headset attachment, data communications, digital voice processing, alternate phone personality modules etc. All resources and information of the telephone can be made available to an Option module 104, regardless in which Option module 104 bay it is connected. Resources include but are not limited to the handset 106, speaker 108, microphone 110, display 112, keys and indicators 114, and ringer circuits. Information includes downlink audio, uplink audio, audio from other modules, downlink control messages, uplink event messages, downlink data, and uplink data.

Access to the telephone resources and some of the information is arbitrated by the microcontroller 118 via a hierarchical option control protocol (described in more detail later in this document). Not all elements of the Option Bus 136 may be required by a Option module 104. For example, additional keys and indicators of an extended keyboard (DSS) only require the Option Control Bus 126 and only those signals are needed at it's connector.

FIG. 3 details the signals included in the Option Bus 136. The Option Data Bus 120 is based on the public domain standard GCI bus. The Option Data Bus 120 is a bit synchronous, time division multiplexed, full duplex, serial data bus. Downlink data from the link interface 116 is carried on Data Downstream (DD) line 302. Uplink data is carried on Data Upstream (DU) line 304 to the link interface 116. The Data Clock (DCL) line 306 carries the clocking signal, sourced by the link interface 116, which is in sync with the bit transfers. The Frame Sync (FSC) line 308 carries the FSC signal, which is indicative of the start of each data frame and is also sourced by the link interface 116.

Each data frame is organized into fields, as detailed in FIG. 4. These fields include Data Communications and Data Control (DCDC) 402, data 404, voice 406, and auxiliary voice 408. By using the timing relationships between the FSC and DCL signals, an Option module 104 can send or receive digital data or voice.

The CODEC 130 also transfers it's voice data to the link interface 116 via the Option Data Bus 120. In normal telephone operation the CODEC 130 transfers the voice data through the voice field 406. However, a special mode permits the CODEC 130 to transfer voice data through the auxiliary voice field 408, however, the voice data to and from the PBX remains in the voice field 406. This allows an Option module 104 to intercept the voice data for processing and then pass it on. This is useful for advanced digital audio processing applications.

Turning again to FIG. 3, the Option Audio Bus 134 provides Option modules 104 with access to several audio sources and destinations within the telephone. Downlink audio from the CODEC 130 is provided on Downlink Voice (DLVn) line 310. Uplink audio to the CODEC 130 is put onto the Uplink Voice (ULVn) line 312. Audio to be sent devices in the telephone base such as the handset 106 or the speaker 108, is put on the Base Input Voice (BIVn) line 314. It should be understood that unique DLVn, ULVn and BIVn lines 310-314 are provided to each Option module 104 (as denoted by the subscript n).

Figure 5:
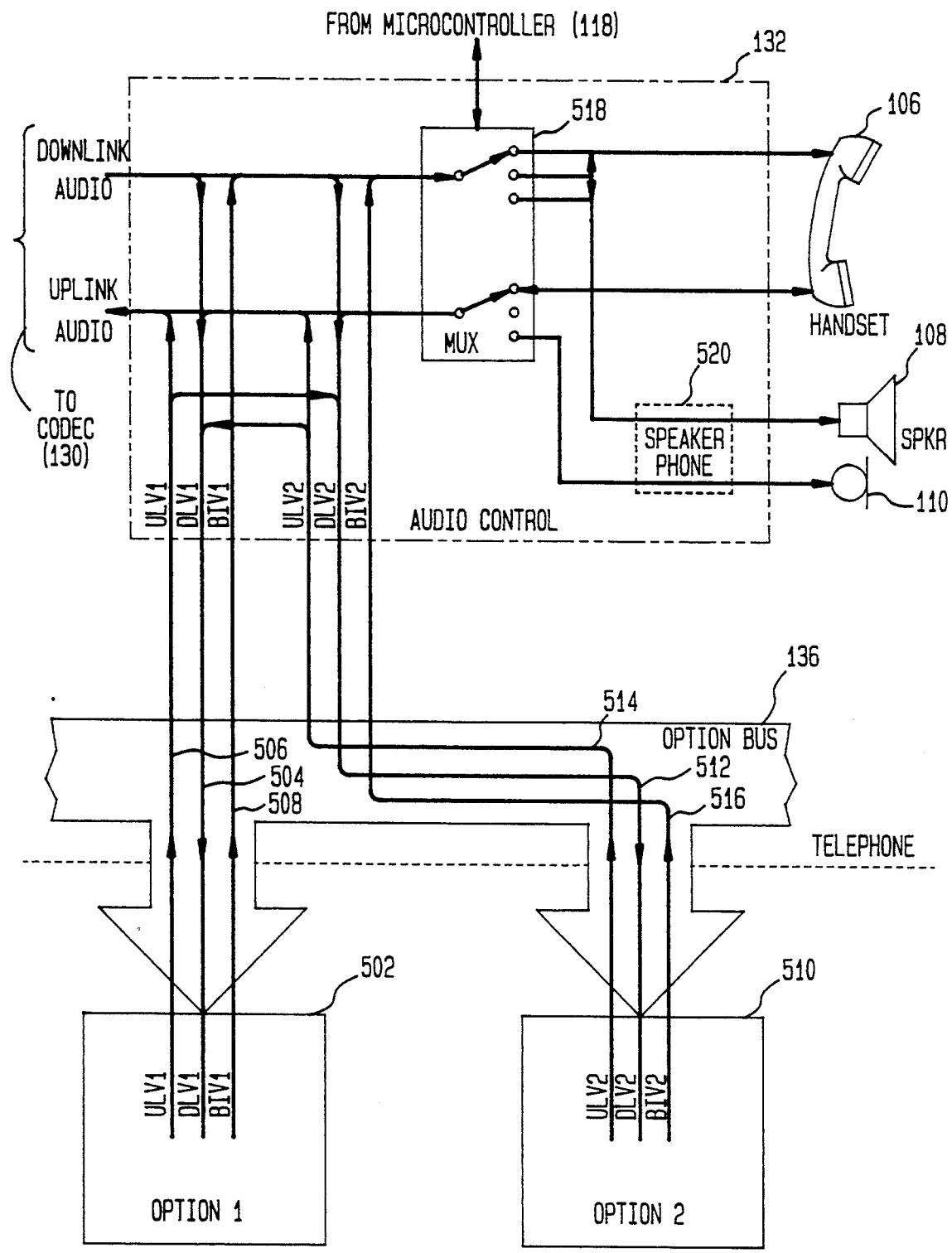
FIG. 5 is a more detailed diagram of the Audio Control Block of FIG. 2, showing an example of an interconnection with two options by way of the Option Bus.

For example, as illustrated by FIG. 5, in a telephone with two Option module 104 bays; module bay 1 502 would be connected to DLV1 504, ULV1 506, and BIV1 508, likewise module bay 2 510 would be connected to DLV2 512, ULV2 514, and BIV2 516. This facilitates the proper amplifying and combining of audio signals such that multiple modules can coexist.

An audio tone is produced whenever a key is pressed on the telephone keypad or DSS. This signal is carried on keytone (KT) line 316 to each module (not shown). All Option modules 104 have access to uplink and downlink audio whenever the telephone is active. Additionally, each Option module 104 receives, with it's downlink audio, the uplink audio of the other Option modules 104. This allows the Option modules 104 to "talk" to each other. The Option modules 104 can send audio to the handset 106 receiver, the speaker 108 or both. Likewise, the Option modules 104 can receive audio from the handset 106 microphone or the speakerphone microphone 110.

Switching of these audio paths is controlled by the microcontroller 118 by way of a conventional multiplexer 518 and facilitated by the hierarchical option control protocol. For a telephone requiring hands-free speakerphone operation, a conventional speakerphone circuit 520 (FIG. 5) can be installed between the speaker 108 and microphone 110 and the multiplexer 518.

The Option Control Bus 126 is based on the conventional Serial Peripheral Interface (SPI) bus. The Option Control Bus 126 is a bit synchronous, full duplex, serial data bus. The Option Control Bus 126 is used to transfer control information between the microcontroller 118 and the option modules 104. Data from the Option modules 104 to the microcontroller 118 is carried on the Master In/Slave Out (MISO) line 318. Data from the microcontroller 118 to the Option modules 104 is carried on the Master Out/Slave In (MOSI) line 320. The Serial Clock (SCLK) line 322 carries the serial clocking signal for the data bits. The slave select (SS*n) line 324 carries a slave select signal which enables (or addresses) transfers to option modules 104. Each option module has a unique slave select line 324 such that only one is enabled at a given time. Thus in a telephone with three option ports the signals SS*i, SS-2 and SS-3 would be provided, respectively, to ports 1, 2 and 3. A RESET line 326 is provided on the Option Bus 136 to synchronize option modules during reset events, such as "power on", within the telephone.

Power to the Option modules 104 is provided by the Option Power Bus 124. These lines 328-336 provide the logic voltages +5V, −5V and Data Ground (DGND) as well as an auxiliary power supply, +VAUX and −VAUX, for Option modules 104 requiring higher levels of power.

Figure 9:
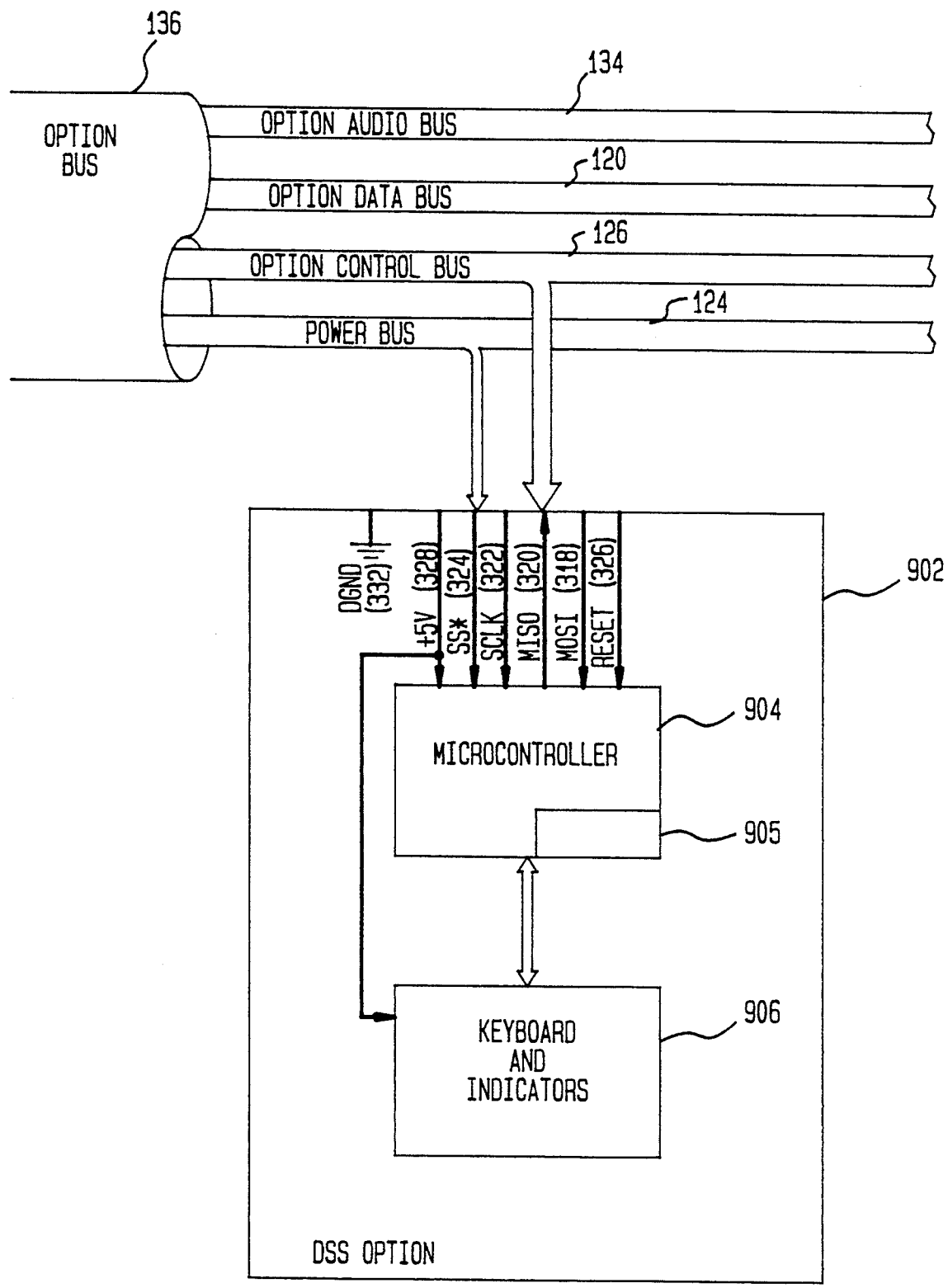
FIG. 9 is a block diagram of an extended keyboard option (DSS)

As previously discussed, one of the options provided on the telephone can be an extended keyboard option (DSS). The DSS provides the base digital telephone with more keys and indicators. As illustrated in FIG. 9, the DSS 902 connects to the Option Bus(136), but only requires the signals of the Option Control Bus and the Option Power Bus. The connection can be made via a unique connector since not all the Option Bus signals are required. The DSS communicates with the base digital telephone via the hierarchical option control protocol as any option module would.

Figure 10:
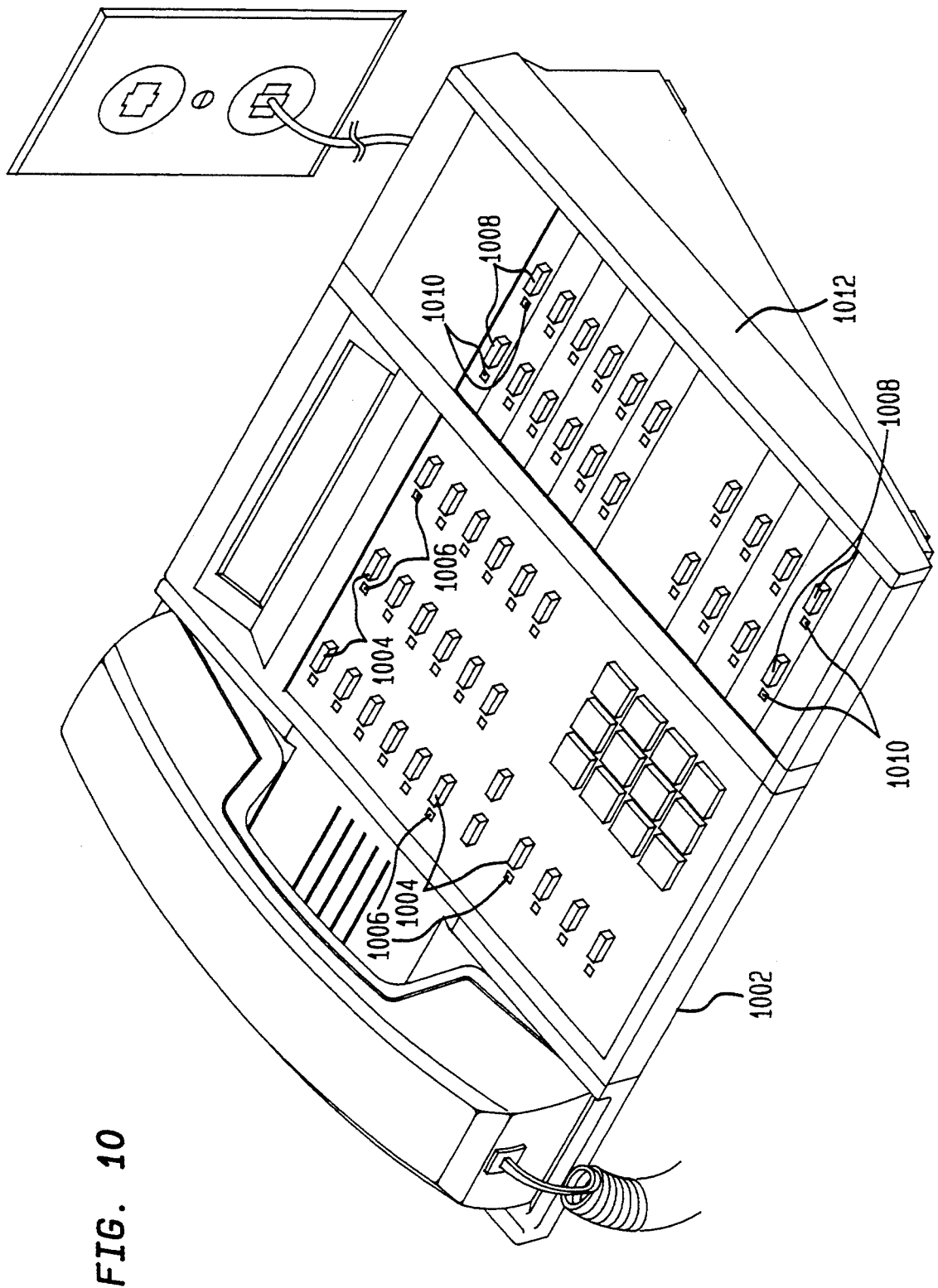
FIG. 10 is a telephone having an extended keyboard option.

The DSS 902 comprises a microcontroller 904, and a keyboard 906 having indicators such as LEDS. The physical layout of the keyboard 906 is the same as the extended keyboard 1012 of FIG. 10. Data from the base telephone's microcontroller 118 is carried to the DSS 902 on the MOSI line 320. Data from the DSS is carried to the microcontroller 118 by the MISO 318 line 320. The SCLK 322, SS*n 324 are provided to the DSS and operate as previously described. Information flow between the microcontroller and Option modules 104 is mediated by the hierarchical option control protocol (described in more detail later). The Reset line 326 is used by the DSS 902 to synchronize during reset events within the telephone such as power on. Power is provided to the DSS 902 from the Option Power Bus 124.

The microcontroller 904 scans the keys for depressions and releases. After a conventional debounce procedure is executed by the microcontroller 904, the microcontroller 904 sends an event message to the base telephone's microcontroller 118 via the Option Control Bus 126. If an indicator is to be asserted, the command message is passed from the base telephone to the DSS 902 via the Option Control Bus 126. The DSS microcontroller 904 includes firmware 905 which maintains the state of each indicator including its cadence. The DSS microcontroller 904 has its own local oscillator and therefore has no direct synchronization to the base telephone's microcontroller 118.

Information flow between the microcontroller 118 and the option modules 104 is mediated by a hierarchical option control protocol. Devices internal to the telephone, such as the link interface 116 and the memory communicate with the microcontroller via the Option Control Bus 126. Though the interface is the same for these devices, the protocol used may differ from that of external option modules 104.

Figure 6:
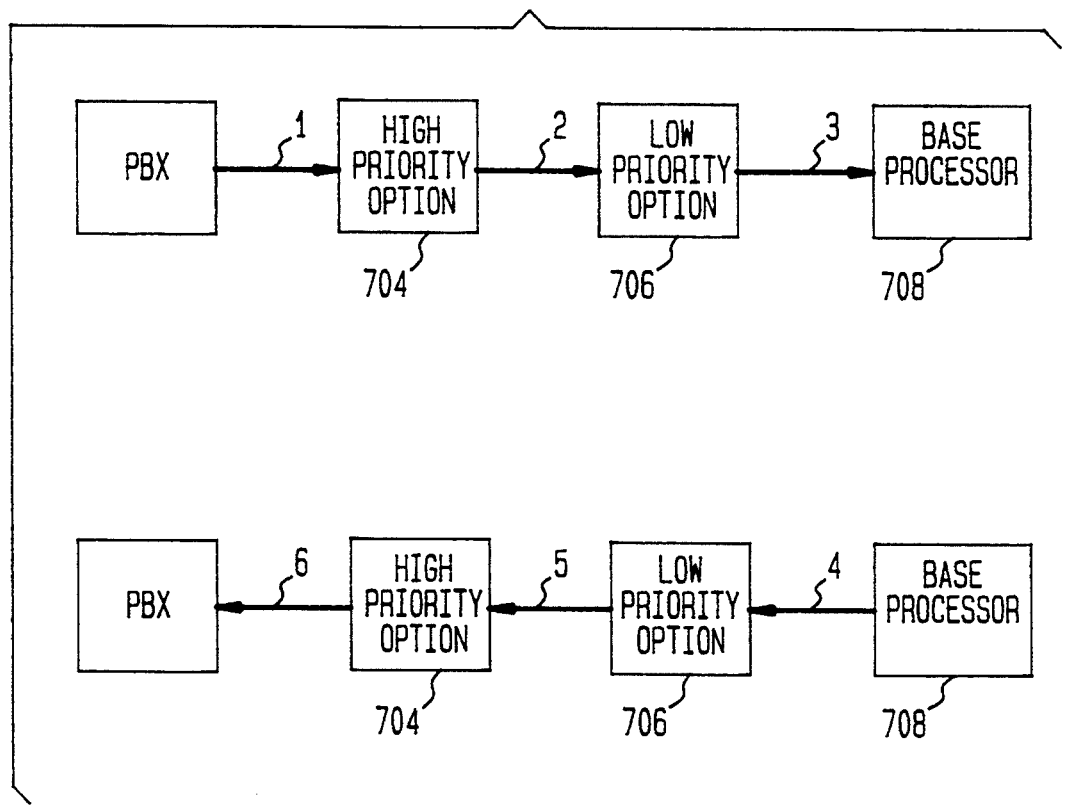
FIG. 6 is a flow diagram of message flow in an embodiment having two options.

FIG. 6 is an example of message flow in an embodiment with two options. Independent of the physical connection of FIG. 1, options are ordered according to priority. A high priority option would typically be a data option, such as a data communications option (DCO). A low priority option would typically be an extended keyboard option (DSS).

The flow of commands (messages from the PBX to the telephone) is illustrated by the set of blocks at the top of the figure. Commands flow first to the highest priority options (Message 1), to the lower priority option (Message2) and finally to the remainder of the telephone and its associated microcontroller 118 (via Message 3).

The flow of events (messages from the phone to the PBX) is illustrated at the bottom of FIG. 6. Events flow from the microcontroller 118 to the lowest priority option (Message 4), to the highest priority option (Message 5) to the PBX (Message 6).

The microcontroller's 118 firmware is logically split into two components; the Base Processor and the Option Processor. The base processor controls the digital telephony functions of the telephone. The Option Processor distributes messages to options and the Base Processor.

At any point in the above-described process an option or the Base Processor can intercept, modify or synthesize a command or event message. The PBX can independently send messages as will. In addition, the system can include any number of smart options(from zero to N). The flow of messages is independent of the particular option module bay to which an option is connected. Options have no requirement of knowledge of the outside system to communicate. Operation codes contained in the messages contain no address information and only encode the direction (command or event) and the type of message.

Figure 7:
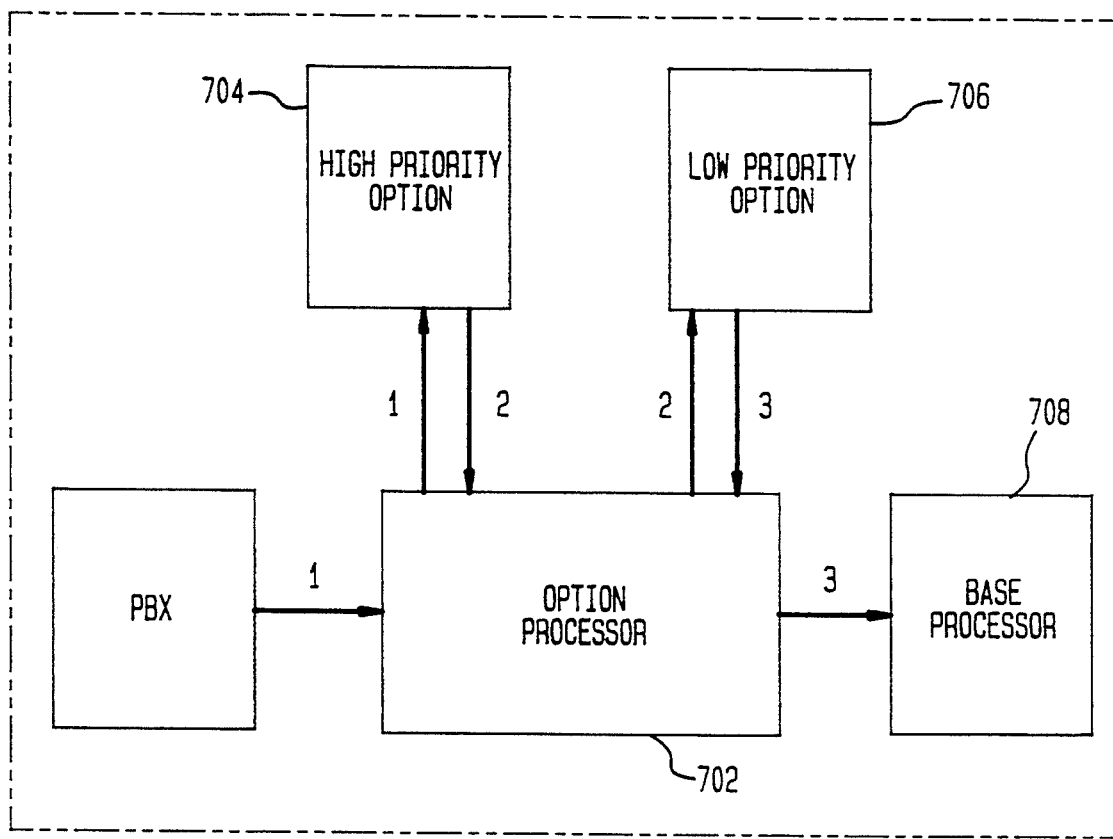
FIG. 7 is a flow diagram showing how command flow in the embodiment of FIG. 6 is accomplished.

FIG. 7 shows how the flow of command messages is accomplished. The PBX sends a Message 1 to the phone. Message 1 travels from the PBX (via the link interface 116) to the Option Processor 702. The Option Processor then sends Message 1 to the highest priority option (the high priority option 704). The high priority option 704 then responds with Message 2, which is sent to the Option Processor 702. Next, the Option Processor 702 sends Message 2 to the next highest priority option (the low priority option 706). In response, the low priority option 706 generates Message 3, which is sent to the Option Processor 702. As no more options exist, the Option Processor 702 sends Message 3 to the Base Processor 708.

Figure 8:
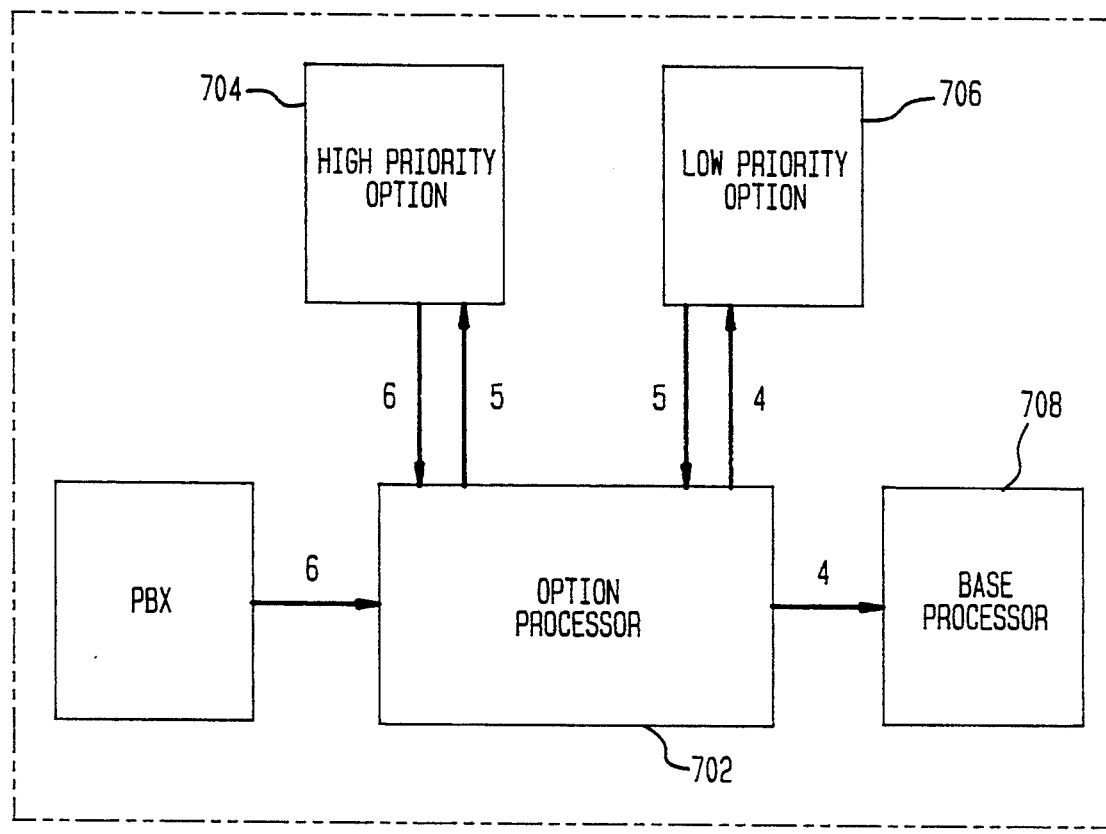
FIG. 8 is a flow diagram showing how event flow in the embodiment of FIG. 6 is accomplished.

This sequence is continued in FIG. 8 with the Base Processor 708 responding with an event, Message 4. The Base Processor 708 sends Message 4 to the Option Processor 702 which, in turn, relays Message 4 to the lowest priority option (the low priority option 706). The low priority option 706 responds with Message 5 and sends it to the Option Processor 702. Message 5 is then sent by the Option Processor 702 to the next highest priority option (the high priority option 704). The high priority option 704 responds with Message 6 and sends it to the Option Processor 702. As no more options exist, the Option Processor sends Message 6 to the PBX.

An example of a typical message sequence is a PBX request for phone ID, as illustrated by the following sequence. The PBX requests a phone ID from the telephone via Message 1. Message 1 is relayed to the high priority option 704 by the Option Processor 702. The high priority option 704 then sends Message 1 unchanged (as Message 2), to the Option Processor 702 which, in turn relays the message to the low priority option 706. The low priority option sends Message 2, unchanged, back to the Option Processor 702 as Message 3. The Option Processor 702 then relays Message 3 to the Base Processor 708.

The telephone base responds to Message 3, a request for phone ID, by identifying its ID, which its sends to the Option Processor as Message 4. The Option processor then relays this message to the next highest priority option (the low priority option 702). The low priority option 702 imparts its own ID on top of the Base phone ID (for example, if it is a DSS, indicating that more keys exist) and sends this collection of information (the Base phone ID and the low priority option ID), to the Option Processor as Message 5. The Option Processor then relays Message 5 to the high priority option 706. The high priority option 706 imparts its ID information on top of the message, for example indicating that it is a data communications option, and forwards this information (all three IDs), as an event (Message 6), to the Option Processor 702. When the Option Processor 702 receives Message 6, it relays it to the PBX. The final message (Message 6) indicates that the phone contains both a data communications option and additional keys as well as information about the base model.

It should be understood that an option can handle a message in a number of ways. Some options will receive the message, take some action, and then not forward or modify the message at all. For example, in order to turn a speaker-phone option "on" in response to a PBX command, the microcontroller will send a command over the Option Bus. In response, the speaker-phone option will activate, however, it will not relay the message. Other options may modify a message without taking any action. For example, an extended keyboard option (DSS) may respond to a command to activate an indicator (e.g. light an LED) that the DSS determines is not present, by remapping the command to an indicator that is present elsewhere (e.g. on the base telephone). The DSS will then transmit the modified command to the Option Processor, in place of the original command which it received. The Option Processor then forwards the modified command the telephone's main keyboard. Still other options will take some action and modify the message as well. For example, in response to a diagnostic command, each option may perform a test, append its status to the message and then forward the message on the next option by way of the Option Processor. As an example of another type of response, an Option for which a particular message is not intended will simply relay the message, unchanged, back to the Option Processor.

Commands (or fixed sequences of instruction codes) are sent to and from options with polled simultaneous command exchange on the Option Control Bus 126. Only one option at a time is selected by the telephone. This is referred to as polling. The Option Control Bus transfers are bi-directional, and both the telephone and the option will issue a command to each other when the telephone initiates the first transfer to an option. As the telephone can issue a poll to an option at any time, an option is required to have a command available for transfer within timing constraints. If a command with a specific function is not available, a NOP command is sent. A NOP can be issued by both the telephone and an option.

A convention for command acceptance is used to determine if the command from the telephone or option will be accepted. If the telephone issues a command, other than a NOP, it will always be accepted, regardless of the command issued by the polled option. If the polled option issues a command, other than a NOP, and the telephone issued a NOP, the polled option command is accepted. If both sides issue a NOP, the command transfer is complete and no data is sent. An individual command may include data associated with it or be a request for specific data.

An example of a command without associated data is an indication that the PBX issued a "phone reset". An example of a command with associated data is communication of a ROLMlink command. An example of a command with a request for data is a request for an option ID. Either the telephone or an option can issue any of the above-described types of commands.

An example of a command set is as follows: A No Operation (NOP) commands is issued by the Option Processor or an Option when no operation needs to be performed. When both the Option Processor and the option issue a NOP, the poll is complete and no more Option Control Bus transfers will occur until the next poll of the option. In the case of only one side issuing a NOP, the non-NOP command is always accepted. This command enables the option processor to poll options for commands. It also enables options to indicate that they have no command to issue during a poll.

The Software Reset Option (RESET) command is issued by the Option Processor when it wants to perform a software reset of one or more options. The definition of the software reset will vary from option to option. The RESET command is issued twice to ensure synchronization. Options must respond to a single command, however, since they may be out of synchronization when the first reset command occurs. The RESET command is issued by the Option Processor whenever a microcontroller reset occurs.

The Report Specified ID (REPORT) command is issued by the Option Processor when it wants to request one of the following from an option: Option ID, Data Priority, Data Mask or Function ID. The command includes a single operand which identifies which information is to be reported. REPORT is a two byte command, while the response from the option is one byte containing the requested information. The information is reported by the option on the second byte of the command transfer.

The Base Receiving Data (BRD) command is a value which the Option Processor issues during the second transfer when the microcontroller is receiving a second transfer of a two byte command from an option. The value has no effect on the command accepted, however, it can help communicate the protocol externally to any external monitoring during debug.

The Option Receiving Data (ORD) command is issued by the option when it is receiving the second transfer of a two byte command from the Option Processor. This command is similar to BRD in that it has no effect on the command accepted, however, it can help communicate the protocol externally to any external monitoring during debug.

The Module Data (DATA) command can be issued by an option or the option Processor. When the Option Processor issues DATA, control data, of an encoded type, is transferred to the option to which the command is directed. The data direction (command or event) is specified by a one bit field (D) of the command and the type of control data (TTT) is specified by a three bit field. Examples of control data types are Keyboard, Display, and Data (e.g. from a data communications option). When an option issues this command, and it is accepted, control data is transferred from the option to the Option Processor.

In the preferred embodiment, the timing of commands is as follows. Between the first and second command bytes (if a second command byte exists) at least 125 micro-seconds will have elapsed to allow for the option processor to respond and complete any other impending tasks. In addition, before a new command is issued, a minimum of 125 micro-seconds will elapse, to permit the option processor to respond and complete any other impending tasks.

Once again considering the DSS 902, it will be appreciated that without a method to maintain the synchronization, the cadence of the LEDs on the telephone and those on the DSS 902 could drift apart. The lack of synchronization could be annoying to the telephone user. Synchronization of LEDs on a DSS or other option and the base telephone is accomplished by way of a synchronization message.

According to an embodiment of the present invention, synchronization between indicators on the base telephone and those on an option is achieved by way of a synchronization message. The synchronization message is an event which is generated by the base digital telephone and is transmitted to the options by way of the option processor. The synchronization message contains no operand information and is only used to indicate that synchronization is to take place. It is discarded by the option processor if no more options exists. Unlike many other types of messages, the synchronization message is not sent to the PBX, as it only has meaning to the base digital telephone and options.

Figure 11:
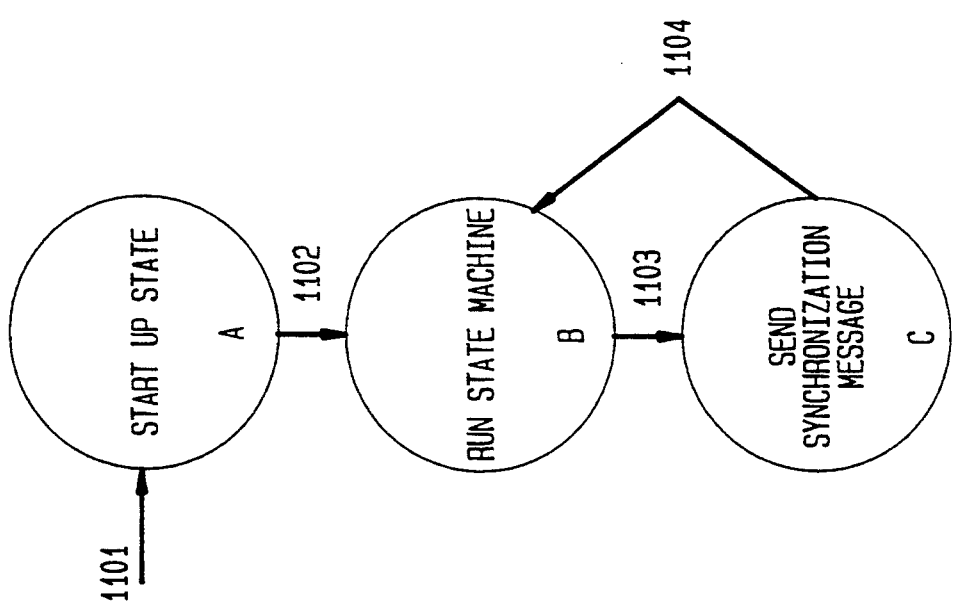
FIG. 11 is a state diagram of LED synchronization message generated on the digital telephone base, according to an embodiment of the present invention; and, FIG. 12 is a state diagram of LED synchronization on an option such as an extended keyboard, according to an embodiment of the present invention.

FIG. 11 illustrates how the base digital telephone issues a synchronization message while operating its cadence state machine. The base telephone's state machine 119 is formed by instructions in the base microcontroller 118. As the base telephone's microcontroller 118 starts up or comes out of a processor reset, it sets the LED cadences to an initial state. Coming out of reset is indicated by transition 1101 reaching state A (start up state). Next, transition 1102 takes place and the cadence state machine is run in state B, updating cadences periodically. When the cadence state machine 119 reaches a predetermined fixed state, transition 1103 takes place, reaching state C (Send Synchronization Message State). In state C, a synchronization message is sent as an event on the option control bus. Next, transition 1104 occurs, resulting in a return to state B (Run State Machine).

An example of the predetermined fixed state is the initial state. It is assumed here the state machine is operating in a mode wherein it will periodically return the initial state. The timing to reach this state determines the synchronization time. An example of an initial state is: Cadence 0—OFF; Cadence 1—OFF; Cadence 2—OFF; Cadence 3—OFF; Cadence 4—OFF; Cadence 5—OFF; Cadence 6—ON; Cadence 7—OFF.

The base telephone controls its LEDs on the keyboard/indictor unit 114 in accordance with the state indicated by the state machine 119. For example, in the above-described initial state, all LEDs set (by the PBX) to a Cadence of 0-5 or to Cadence 7 are turned OFF. All LEDs having a Cadence of 6 are ON. Since the state of the indicators on the base telephone is controlled by the base telephones state machine 119, the base microcontroller 118 can determine the state of the indicators on the base telephone at any given time.

The determination as to when the base telephone's LED control state machine 119 has reached the predetermined state is made by the base telephone's microcontroller 118. The instructions that identify and cause the microcontroller 118 to recognize that the pretermined state has been attained are preferably precoded into the base microcontrollers firmware, although the predetermined state could, alternatively, be made user programable.

Figure 12:
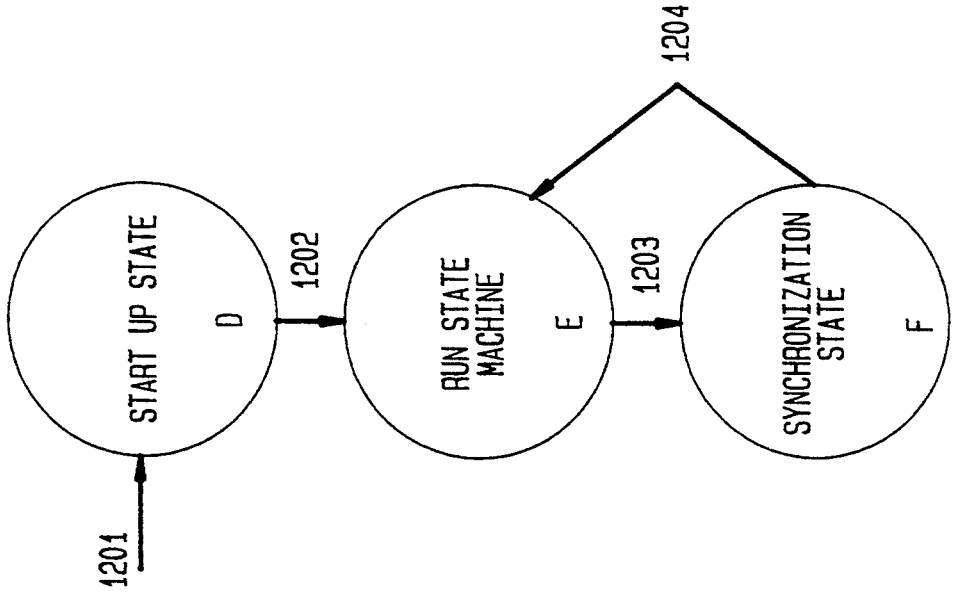

FIG. 12 illustrates how the DSS 902 or other option receives a synchronization message while operating its cadence state machine and synchronizes with the base digital telephone. Similar to the base telephone, the DSS state machine is formed by instructions in the LED state control firmware 905 of the DSS microcontroller 904. The DSS (or other option) comes out of reset via transition 1201 and sets its LED cadences to an initial state D (Start Up State). Next, transition 1202 takes place and the DSS cadence state machine is running in state E. When a synchronization message is received by the DSS on the option control bus, transition 1203 takes place and the option goes to the synchronization state F. In this state the DSS is placed in the same state as the Main Digital telephone was in (the "predetermined" state) when it made transition 1203. Following synchronization, transition 1204 takes place, resulting in the DSS running the state machine in state E. The DSS is, of course, just one example of an option having LEDs. It will be appreciated that LEDs on other types of options can also be synchronized with the LEDs on the base telephone in the above-described manner.

An option will typically not be very far out of synchronization when the synchronization state message is received, but will adjust to be more closely synchronized between the main digital telephone and the option. In this way, the main digital telephone and the option operate in synchronization in their respective cadence state machines. Thus, indicators which are at the same cadence in the base digital telephone and an option will operate as through a single state machine were controlling both.

The above described system and method of LED synchronization has a number of advantages. LED cadences are produced via the same state machines in all options which contain LEDs. Further, a single auxiliary device or option controls the master synchronization, and sends out periodic messages to options to resynchronize LEDs based on its state. The option on receiving this message sets its LED cadences to the same state. Even if an occasional LED synchronization message is lost the system will eventually resynchronize. Advantageously, this loss will not put LEDs perceptibly out of phase, as the base and auxiliary cadence state machines will still continue to operate in phase to the users perception.

Now that the invention has been described by way of the preferred embodiment, various enhancements and improvements which to not depart from the scope and spirit of the invention will become apparent to those of skill in the art. Thus it should be understood that the preferred embodiment has been provided by way of example and not by way of limitation. The scope of the invention is defined by the appended claims.

We claim:

1. In a digital telephone having an interface to a telephony communications switch, a base telephone coupled to the switch, and an auxiliary device coupled to the base telephone, each of the auxiliary device and the base telephone including a cadence control state machine; a method of synchronizing visual indicators on the base telephone with the visual indicators on the auxiliary device comprising the steps of:
   setting the visual indicators on the base telephone to an initial state;
   setting the visual indicators on the auxiliary device to the initial state;
   operating a first visual indicator on the base telephone at a first cadence;
   operating a second visual indicator on the auxiliary device at a second cadence, the second cadence being substantially the same as the first cadence;
   when the cadence control state machine of the base telephone is in a predetermined state, sending a synchronize message to the auxiliary device and then continuing to operate the first visual indicator at the first cadence; and,
   upon receipt of the synchronize message by the auxiliary device, setting the cadence control state machine of the auxiliary device to the predetermined state and then continuing to operate the second visual indicator at the second cadence.

2. The method of claim 1 wherein the base telephone is coupled to a plurality of the auxiliary devices and an option processor coupled to each of the auxiliary devices and comprising the further step of relaying the synchronization message from the auxiliary device to another auxiliary device.

3. The method of claim 1 wherein the visual indicators are light emitting diodes and wherein the predetermined state is "turned off".

4. The method of claim 3 wherein the auxiliary device is an extended keyboard.

5. The method of claim 1 wherein the predetermined state is the initial state.

6. A digital telephone, comprising:
   an interface to a telephony communications switch;
   option processor means, coupled to the switch, for distributing messages to auxiliary devices (options);
   base processor means, coupled to the switch, for controlling the base digital telephone, the base processor means comprising means for operating a plurality of visual indicators at a programmable cadence and for generating a synchronization message when the indicators are in a predetermined state;
   a plurality of ports for coupling the base processor means and the option processor means to one or more of the options;
   wherein, the option processor comprises:
   means for determining a priority for each of the options;
   means for receiving the synchronization message from the base processor; and,
   means for relaying the synchronization message to each of the options in priority order
   and wherein at least one of the options comprises:
   means for setting the option's visual indicators to the predetermined state in response to receipt of the synchronization message; and,
   means for relaying the indicator synchronization message back to the option processor.

7. An extended keyboard for use in a base digital telephone, the extended keyboard comprising:
   a plurality of visual indicators;
   means for receiving a message generated by the base digital telephone;
   means for recognizing the message as being a command to synchronize the visual indicators;
   means for setting the visual indicators in accordance with a predetermined state in response to the message; and, means for returning identification and status information to the base digital telephone in response to the message.

8. The extended keyboard of claim 7, further comprising:
   means for intercepting an indicator control command sent to the base telephone from a private branch exchange,
   means for operating a visual indicator in response to the indicator control command;
   means for modifying the indicator control command so as to form a modified indicator control command;
   means for relaying the indicator control command to an auxiliary device coupled to the base telephone.

9. A digital telephone, comprising:
   link interface means for receiving digital data from telephony line;
   control means, connected to receive the digital data from the link interface means, for generating control messages in response thereto;
   a main keyboard, coupled to the link interface means and the control means, the main keyboard including telephone keys, and a first set of visual indicators and indicator control logic; the key/indicator control logic comprising means for generating a synchronization control message indicative that the first set of visual indicators are in a first state;
   audio processing means, coupled to the link interface means, for decoding an audio portion of the digital data and for generating an analog audio signal therefrom;

a plurality of ports for receiving options, each of the ports being connected to receive the analog audio signal, the indicator synchronization message and at least a portion of the digital data;

an extended keyboard plugged into one of the ports, the extended keyboard including a second set of visual indicators and means for receiving the indicator synchronization control message or for recognizing the indicator synchronization message as a command to set the second set of visual indicators to the first state;

message passing means, coupled to the processing means and each of the ports, for relaying the control messages, including the indicator synchronization control message, between the options.

10. The digital telephone of claim 9 wherein at least some of the options are of a type that plug in to the ports.

11. The digital telephone of claim 10 wherein each of the ports are connected to receive downlink digital audio information from the link interface and uplink digital audio information destined for the link interface.

12. The digital telephone of claim 10 wherein the control message and the portion of the digital data received by the options are in the form of data frames.

13. The digital telephone of claim 12 wherein at least one option comprises means for modifying a control message before relaying the control message to another one of the options.

14. The digital telephone of claim 12 wherein the message passing means comprises means for relaying the control messages between the options according to a hierarchical protocol.

15. The digital telephone of claim 12 wherein at least one option can do any of receive and modify a control messages, receive and relay the control message without modification and receive and absorb the control message.

16. The digital telephone of claim 12 wherein the message passing means comprises option processor means for originating at least some of the control messages.

17. The digital telephone of claim 16 wherein the control messages include a command set.

18. The digital telephone of claim 17 wherein the command set includes a command for request and option identification number.

19. In a digital telephone having an interface to a telephony communications switch, a base telephone coupled to the switch, and an auxiliary device coupled to the base telephone; a method of synchronizing visual indicators on the base telephone with the visual indicators on the auxiliary device comprising the steps of:

setting each of the visual indicators on the base telephone and the auxiliary device to an individual cadence and an initial on/off state;

operating the each of the visual indicators on the base telephone and the auxiliary device at its individual cadence;

detecting when the visual indicators on the base telephone are in a predetermined on/off state;

when the predetermined on/off state is detected, sending a synchronize message to the auxiliary device and then continuing to operate the visual indicators on the base telephone; and, upon receipt of the synchronize message by the auxiliary device, setting the visual indicators on the auxiliary device to the predetermined on/off state and then continuing to operate the visual indicators on the auxiliary device.

* * * * *